UNITED STATES PATENT OFFICE.

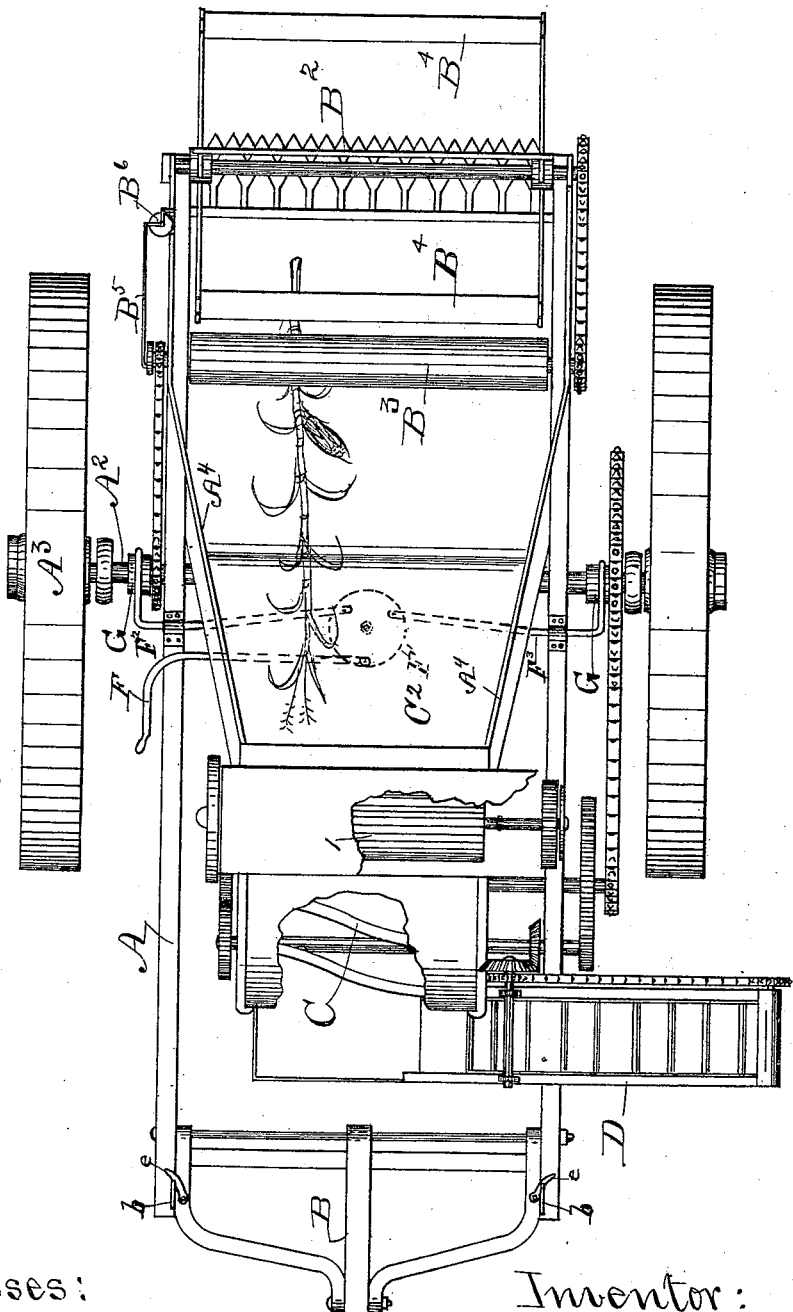

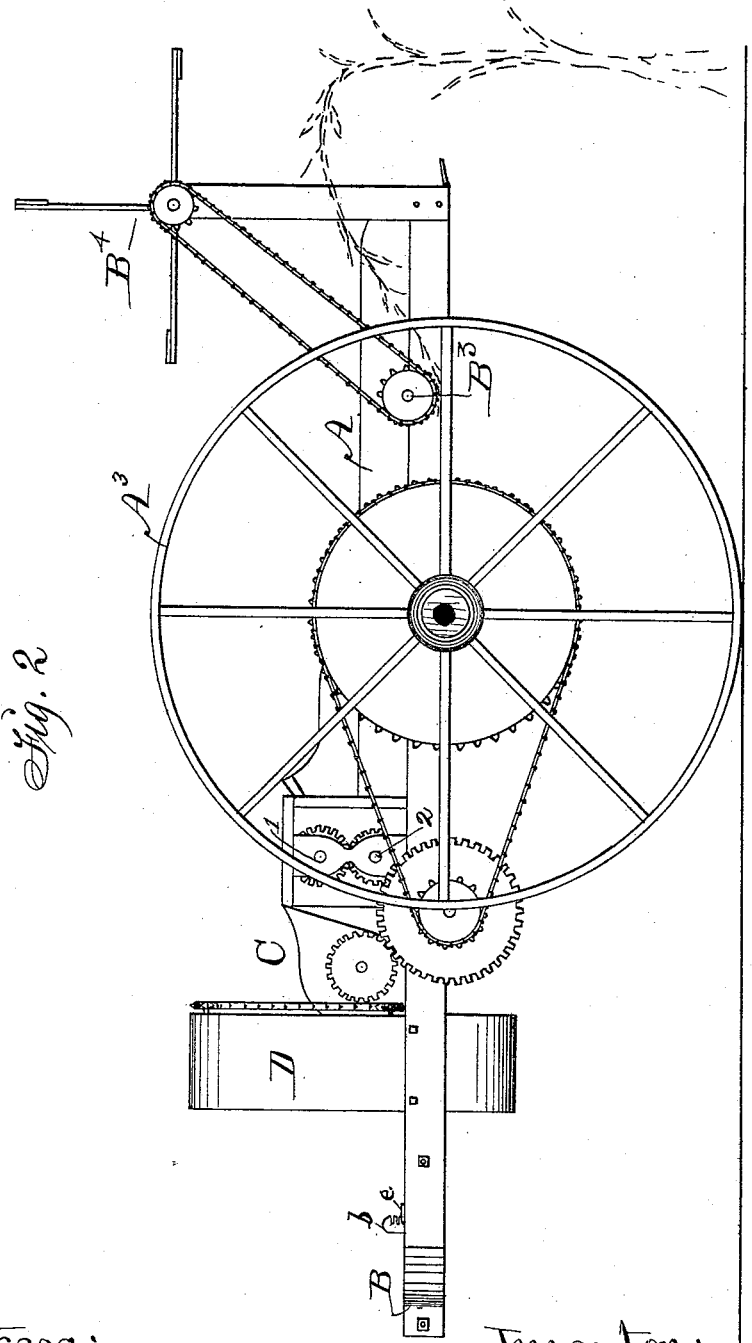

CHARLES C. FENNO, OF GRINNELL, IOWA.

CORN-HARVESTER AND FEED-CUTTER.

SPECIFICATION forming part of Letters Patent No. 473,111, dated April 19, 1892.

Application filed December 5, 1890. Serial No. 373,631. (No model.)

*To all whom it may concern:*

Be it known that I, CHARLES C. FENNO, a citizen of the United States of America, and a resident of Grinnell, in the county of Poweshiek and State of Iowa, have invented a new and useful Corn-Harvester and Feed-Cutter, of which the following is a specification.

My object is to gather corn in the field and cut the stalks, leaves, and ears into small pieces to facilitate handling, curing, storing, and feeding the same advantageously.

My invention consists in the construction and combination of a sickle, a reel, a rotary cutter, and mechanisms for conveying the stalks to the rotary cutter and the cut feed from the cutter with a carriage, as hereinafter set forth, pointed out in my claim, and illustrated in the accompanying drawings, in which—

Figure 1 is a top view, and Fig. 2 a side view, of my machine.

A is a frame adapted in size and shape to support the operative mechanism mounted upon an axle $A^2$, that has loose traction-wheels $A^3$ on its ends in such a manner that the wheels and axle can be connected by means of ratchets or clutch devices G, so that they will rotate jointly, as required, to transmit power therefrom to the sickle, reel, cutter, and conveyers. The frame has a platform $C^2$, which has side walls $A^4$, that approach each other to the rear, so that stalks of corn that fall upon the platform are crowded closer together as they are carried rearward by the operating mechanism.

B is a pole hinged to the rear end of the frame in such a manner that horses can be hitched thereto to advance the machine in the opposite direction from which the pole is extended, and also in such a manner that the sickle can be raised and lowered at pleasure, as required, to cut off stalks at different points relative to the ground at different times. In order to effect this adjustment of the frame, it is provided at its rear end with a notched plate *b* at each side of the tongue, and the tongue is provided with a latch *e* for each plate. As the axle $A^2$ is located about midway of the frame, when it is desired to change the relative position of the sickle the latches are released from the plates and the end of the frame raised or lowered, as required, and the latches are again slipped into engagement with the plates.

$B^2$ is a sickle of common form attached to the front end of the frame and connected with the rotating axle $A^2$ in such a manner that a reciprocating motion will be imparted to the sickle by the continuous rotary motion of the axle when the wheels and axle rotate jointly.

$B^3$ is a rotating shaft in the frame A. It is connected with the rotating axle $A^2$ by means of drive-wheels and chains, and the sickle-bar $B^2$ is connected with the wheel on the end of the shaft by means of a pitman $B^5$ and a bell-crank lever $B^6$.

$B^4$ is a reel connected with the feed-roller shaft by means of drive-wheels and chains. The reel is so located in relation to the roller $B^3$ and the sickle that it will strike the top of the corn and press it backward and downward, as shown in dotted lines in Fig. 2, until it is caught by the roller and drawn in by the rotation of the roller until it is cut off by the advancing sickle.

C is a rotating feed-cutter in the rear portion of the frame A at the rear end of the tapering platform $C^2$ and connected with the rotating axle $A^2$ by means of drive-wheels and gear-wheels in such a manner that motion will be transmitted thereto from the axle and increased in speed, as required, to cut the stalks, leaves, and ears as they are advanced rearward from the sickle by means of the feed-rollers Nos. 1 and 2 and over a fixed platform $C^2$ to the cutter.

D is an endless carrier that extends upward and laterally from the rear of the cutter, as required, to convey the cut feed into a wagon or other suitable receptacle at the side of the machine.

F is a lever connected with a circular plate or disk F', pivotally secured to the under side of the platform $C^2$. (Shown in dotted lines in Fig. 1.) Two other rods or levers $F^2$ and $F^3$ are connected at one end with the plate and at their opposite ends are connected with the clutches G on the axle $A^2$ in such a manner that the wheels $A^3$ can be readily locked to the axle, as required, to rotate the axle and thereby operate the sickle, reel, feed-roller, cutter, and conveyer in concert with each other as the machine is advanced in the field to gather a crop, and also readily unlocked, as required, to move the machine without actuating the operative mechanism.

In place of advancing the machine to gather and cut corn it may be located and cornstalks or any other material that is to be cut up for feed fed into the machine by hand, as in thrashers, or in any suitable way.

I claim as my invention—

In a corn-harvester, the combination of a frame having a tapering platform, the side walls of which approach each other to the rear, mechanism at the front of the frame for cutting the stalks from the roots, mechanism at the rear for cutting the stalks into short pieces and conveying them to one side of the platform, said mechanism comprising two rollers journaled transversely at the rear of the platform, a rotary cutter at the rear of the rollers and an endless carrier at the rear of the cutter, and means for operating the mechanism, substantially as described.

CHARLES C. FENNO.

Witnesses:
J. F. WILSON,
H. E. GRISWOLD.